3,062,634
AQUATIC HERBICIDAL COMPOSITIONS EMPLOYING POLYOLEFINS AS CARRIERS

Norwood K. Talbert, Kansas City, Mo., assignor to Spencer Chemical Company, Kansas City, Mo., a corporation of Missouri
No Drawing. Filed May 6, 1959, Ser. No. 811,281
17 Claims. (Cl. 71—2.1)

This invention relates to aquatic herbicidal compositions and, more particularly, this invention relates to finely divided polyethylene impregnated with a herbicidal compound for use in controlling aquatic plants.

Aquatic plants growing out of place are usually considered weeds and the damage due to these aquatic plants has been estimated in the billions of dollars. For example, in Louisiana, it has been estimated that water hyacinth alone causes an annual depletion in the State's wildlife crop value of more than fifteen million dollars. In irrigation canals and drainage ditches, the presence of aquatic plants creates a major obstruction to the water flow and in the inland waterways of the South create an obstruction to navigation. Many small ponds and lakes are rendered almost useless due to infestation with aquatic weeds. Aquatic weeds also provide an ideal breeding place for mosquitoes and the decay of organic matter with concomitant oxygen consumption results in foul water and death to the fish.

Mechanical means for controlling aquatic weeds such as dredging, chain dragging and hand raking have been attempted but have proved to be slow and expensive. Recently, control of aquatic plants by chemicals has been proposed; however, application techniques have not been perfected and as a result this method has been quite expensive. Another disadvantage with this method is that the safety margin between chemical concentrations that will kill the plants and concentrations toxic to fish has proved to be quite narrow.

Aquatic herbicides which are presently recommended for emergent and surface aquatics are the selective herbicides such as 2,4-dichlorophenoxyacetic acid and 2,4,5-trichlorophenoxyacetic acid. These herbicides are usually applied by spraying a kerosene emulsion on the surface of the water. Other contact sprays containing contact herbicides such as the dinitrophenols, sodium arsenate, and ammonium sulfamate, also are used. However, these emulsion-type herbicidal compositions have many disadvantages, as will be pointed out below.

There are provided by this invention aquatic herbicidal compositions comprising polyethylene impregnated with a herbicide and in a finely divided state which are useful for controlling emergent and floating aquatic plants. These aquatic herbicidal compositions are lighter than water and thus float on the surface of the water. Due to the electrostatic charge and hydrophobic nature of the finely divided polyethylene, it has been found that the material tends to be attracted to the surface of the aquatic plant. The finely divided polyethylene particles release the herbicide slowly and kill the aquatic plant; yet, due to the low concentration required, the particles do not tend to be toxic to the fish in the water.

In contrast to soluble or emulsifiable formulations, the herbicidal compositions of this invention can be applied to deep or shallow water. The application rate is independent of the water depth since the compositions float. They also reduce the hazard due to drift associated with the volatile hormone-type herbicides since the herbicide is slowly released from the polyethylene composition.

As the plants die and sink after contact with the herbicide-impregnated polyethylene, the polyethylene particles rise to the surface and are available for further use resulting in a very long lasting material. Other advantages of the floating herbicide compositions are that wind transports the herbicide compositions with floating aquatics and, also, rainfall does not decrease their effectiveness.

The choice of the particular herbicide used will depend upon the type of control desired. The various contact-type organic herbicides are especially useful. For example, where it is desired to control selectively broad leaf plants, finely divided polyethylene impregnated with 2,4-dichlorophenoxyacetic acid ("2,4-D") is especially useful. Derivatives of "2,4-D," such as the salts and esters, also may be used advantageously. Where it is desired to control both broad and narrow leaf plants, a non-selective herbicide such as a dinitrophenol can be used. Of course, sometimes, a combination of two or more herbicidal compounds can be used advantageously.

The compositions of this invention are particularly suitable for the control of emergent and surface aquatics, that is, plants which are rooted below the water surface, but rise above the water line, such as the tule, cattail, bur-reed, sedge, rush, arrowhead, water lotus, pond lily, water willow, water primrose and pickerel weed, as well as plants which float freely on the water surface and those that are rooted to the sides or bottom of the pond and float only in a fixed area.

Finely divided polyethylene can be impregnated with a herbicide by heating a mixture of polyethylene and a herbicide to the melting point in an apparatus such as a Banbury mill, milling for a short time, and then cooling, thus producing finely divided polyethylene having the herbicide fused or impregnated therein. Other means of incorporating the herbicide include heating a mixture of polyethylene and the herbicide to the fusion point with sufficient mixing to give a homogeneous composition, extruding the mixture into strands, and subsequently chopping the strands into pellets of polyethylene impregnated with the herbicide. The pellets then can be finely divided by further chopping, or milled as described above.

It has been found that polyethylene suitably impregnated with up to about 8% and preferably about 2% to 6% by weight of "2,4-D" gives suitable compositions. The amount of other herbicides that are added to polyethylene will vary somewhat depending upon their toxicity and effectiveness but in most cases 0.1% to 10% by weight is adequate; more than 10% by weight of herbicide in the compositions generally would not be desirable or economical. Of course, the concentration of herbicide will also be limited to that which will give a composite particle having a specific gravity of less than 1.

The herbicide-impregnated finely divided polyethylene particles useful as aquatic herbicides generally have a particle size of up to about 1000 microns, and preferably of about 150–500 microns. It has been found that finely divided polyethylene of this particle size appears to have an electrostatic charge manifested by its tendency to be attracted to and stick to the surface of the aquatic plant. Thus, this provides a herbicidal composition which concentrates on the surface of the plant where it can do the most good. For example, when a leaf is dipped into a beaker containing water, the surface of which is covered with finely divided polyethylene, the polyethylene is attracted to the leaf and when the leaf is withdrawn the surface of the leaf is covered with the finely divided polyethylene.

Although the invention has been described specifically in regard to the use of polyethylene, other polyolefins such as polypropylene and polybutylene can also be employed since they are all lighter than water.

The following examples are intended to further illustrate, but are not to be considered to limit, the invention.

Example 1

Polyethylene impregnated with 2,4-dichlorophenoxyacetic acid (4 pounds of herbicide to 100 pounds of polyethylene) was prepared in a Banbury mill by first "banburying" the mixture of polyethylene and "2,4-D" and then cooling the molten mass in the mill. The majority of the resulting particles were about 150–500 microns in size. There 4-liter beakers were set up each containing two species of emergent aquatic weeds (a cane and a broad leaf) in water. One beaker was a control to which nothing was added. In the second beaker, a control, the water surface was treated with finely divided polyethylene containing no herbicide. The third beaker was treated with the finely divided polyethylene containing "2,4-D" in an amount to give a "2,4-D" concentration of 50 ppm. or an actual surface concentration equivalent to 73 pounds of "2,4-D" per acre. After 44 hours, the plants treated with the polyethylene–"2,4-D" composition began to wilt. At the end of 64 hours, they were dead. The plants in both control beakers remained unaffected.

Example 2

A small farm pond near Pittsburg, Kansas, was treated with finely divided polyethylene impregnated with "2,4-D" (4 pounds of herbicide to 100 pounds of polyethylene). The particle size was about 150–500 microns. The powdered material was sprinkled on the surface of the pond at a rate of about 35 pounds per acre, equivalent to 1.4 pounds of "2,4-D" per acre. The powder was applied on the downwind side of the pond by hand. Three days after application, it was observed that the water lilies in the pond had begun to wilt. Small broad leaves around the water's edge were dead. Some of the powder had been left as a film on the pond bank where the water level had receded due to evaporation in the hot, dry, windy weather. Yet, some powder was still floating on the water surface.

Nine days after application the pond was again observed. Heavy rains with wind had occurred since the previous observation thereby raising the water level. The lilies were completely wilted and most of them had collapsed on the water surface. Some had disappeared beneath the surface of the water. No powder was observed on the water surface; some had been washed up on the bank while the remainder was deposited on stems of new plants brought into contact with the water surface by the increase in water level.

The pond was again observed one month after treatment. All vegetation in the pond had completely disappeared and it was impossible to detect where the emergent aquatic plants had once stood. Furthermore, there was a marked decrease in the stand of broadleaf aquatics that were not in contact with the water at this observation or at the time of treatment, but had been in the water for a short time due to the rise in water level following the previous heavy rain.

Although the invention has been illustrated by means of specific examples, it is not desired or intended that it be limited solely thereto for the precise proportions of the active herbicides can be varied, equivalent members of the class of contact herbicides can be substituted and other materials can be employed if desired without departing from the scope and spirit of this invention as defined in the appended claims.

What is claimed is:

1. A herbicidal composition comprising finely divided polyethylene impregnated with a phytotoxic amount of a herbicide.
2. A water floatable aquatic herbicidal composition comprising finely divided polyethylene impregnated with a phytotoxic amount of a contact herbicide.
3. The composition of claim 2 in which the contact herbicide is a member of the group consisting of 2,4-dichlorophenoxyacetic acid and its herbicidal derivatives.
4. The method for controlling aquatic plants which comprises applying a herbicidal dosage of finely divided polyethylene impregnated with a phytotoxic amount of a herbicide to water in which the aquatic plants grow.
5. The method of controlling aquatic weeds which comprises applying a herbicidal dosage of a water floatable finely divided polyethylene impregnated with a phytotoxic amount of a contact organic herbicide to the surface of water containing aquatic weeds.
6. The method of controlling aquatic weeds which comprises applying a herbicidal dosage of finely divided polyethylene impregnated with a phytotoxic amount of a member of the group consisting of 2,4-dichlorophenoxyacetic acid and its herbicidal derivatives to the surface of water containing growing aquatic weeds.
7. The method of claim 6 in which the finely divided polyethylene is impregnated with about 2% to 6% by weight of 2,4-dichlorophenoxyacetic acid.
8. The method of claim 4 in which the finely divided polyethylene is impregnated with about 0.1% to 10% by weight of the herbicide.
9. The composition of claim 1 in which the finely divided polyethylene is impregnated with about 0.1% to 10% by weight of the herbicide.
10. The composition of claim 3 in which the compositions contain about 2% to 6% by weight of 2,4-dichlorophenoxyacetic acid.
11. A herbicidal composition comprising a finely divided water floatable polyolefin impregnated with a phytotoxic amount of a herbicide.
12. A herbicidal composition comprising finely divided polypropylene impregnated with a phytotoxic amount of a herbicide.
13. A herbicidal composition comprising finely divided polybutylene impregnated with a phytotoxic amount of a herbicide.
14. The method for controlling aquatic plants which comprises applying a herbicidal dosage of a finely divided water floatable polyolefin impregnated with a phytotoxic amount of a herbicide to water in which the aquatic plants grow.
15. The method for controlling aquatic plants which comprises applying a herbicidal dosage of finely divided polypropylene impregnated with a phytotoxic amount of a herbicide to water in which the aquatic plants grow.
16. A composition according to claim 12 in which the finely divided polyolefin has a particle size up to 1000 microns.
17. A composition according to claim 2 in which the finely divided polyethylene has a particle size up to 1000 microns.

References Cited in the file of this patent

UNITED STATES PATENTS

| | | |
|---|---|---|
| 2,394,916 | Jones | Feb. 12, 1946 |
| 2,642,351 | Swezey | June 16, 1953 |
| 2,652,323 | Mowry et al. | Sept. 15, 1953 |
| 2,951,753 | Groves | Sept 6, 1960 |

OTHER REFERENCES

Rigg in "Northeastern Weed Control Conference, Ninth Proceedings," 1955, pages 535 to 544.

Younger in "Northeastern Weed Control Conference," pages 322 to 326, January 1959.